Figures 1, 2:
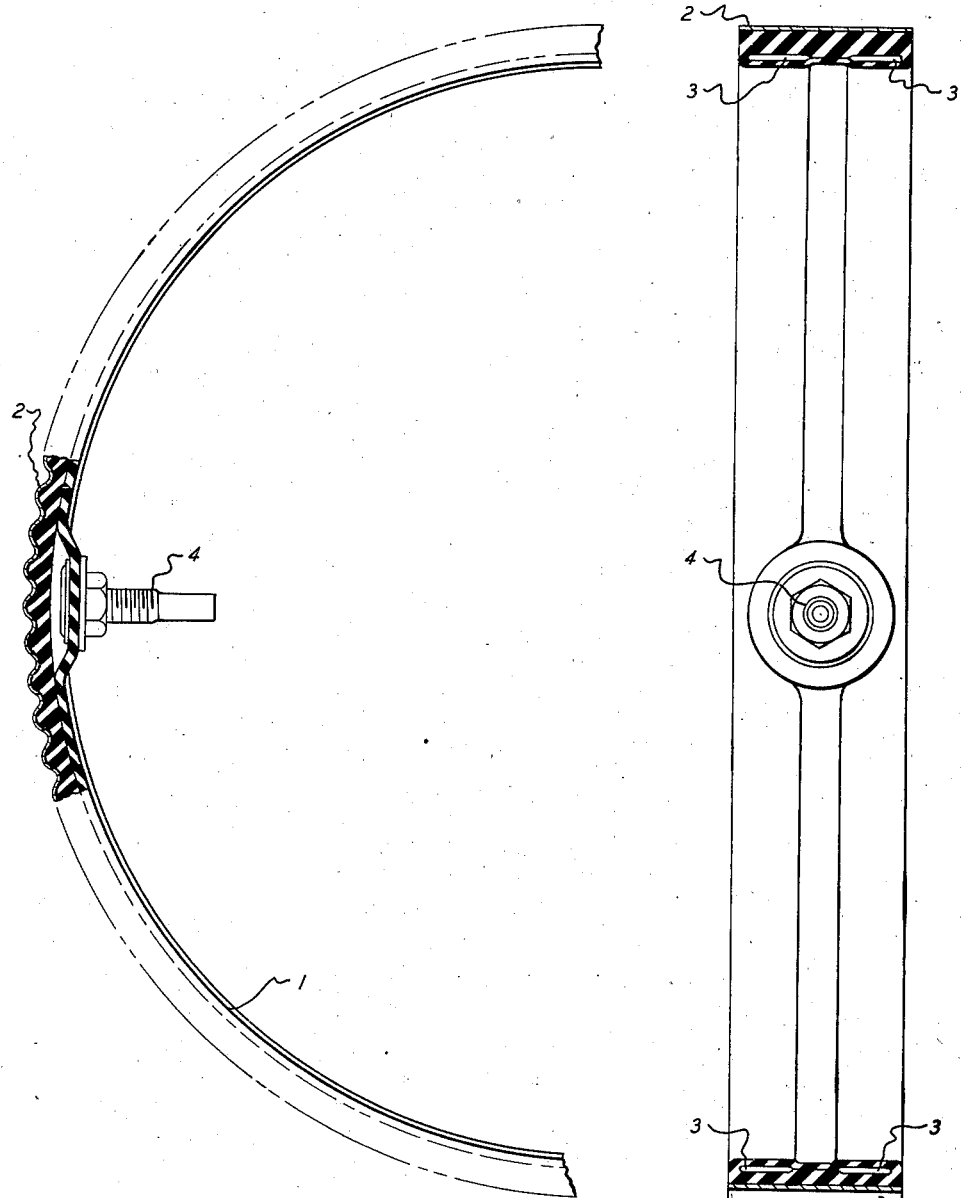

July 30, 1946.  C. HOLLERITH  2,404,801

REINFORCING EXPANDER TUBE CONSTRUCTION

Filed June 17, 1943

Inventor

CHARLES HOLLERITH

By Beaman + Langford

Attorneys

Patented July 30, 1946

2,404,801

UNITED STATES PATENT OFFICE 2,404,801

REINFORCING EXPANDER TUBE CONSTRUCTION

Charles Hollerith, Jackson, Mich., assignor, by mesne assignments, to The B. F. Goodrich Company, Akron, Ohio, a corporation of New York Application June 17, 1943, Serial No. 491,174

6 Claims. (Cl. 137—156)

The present invention relates to expander tubes for hydraulic brakes and more particularly to resilient means for resisting the inflation of the expander tube, reducing drag and protecting the tube.

Hydraulic brakes employing expander tubes are provided with annularly arranged brake blocks which are urged outwardly into engagement with a brake drum by means of an expander tube having the interior thereof connected to the source of hydraulic fluid. The expander tube is a flexible annular tube of rubber or the like arranged to expand outwardly upon being subjected to internal pressure by means of hydraulic fluid.

In the operation of some hydraulic brakes, as for example those employed on aircraft landing wheels, it is convenient for the pilot to rest his foot on the brake pedal at certain periods during the operation without applying a braking force to the brake pedal. The ordinary hydraulic brake does not have sufficient resistance to overcome the weight of the pilot's foot and consequently when a pilot rides his foot on the brake pedal, the brake is lightly applied resulting in a wearing of the brake blocks. According to the present invention a resilient spring is disposed around the periphery of the expander tube to resist outward expansion thereof so as to prevent the slight application of the brakes when the pilot is merely resting his foot on the brake pedal. This spring also acts to collapse the tube to reduce drag. Furthermore, its use avoids the necessity of shims and shields between the tube and brake block joints. Specifically the spring in its preferred form consists of a corrugated, spring steel, annular, endless band to which the expander tube is molded.

An object of the present invention is to equip a hydraulic brake expander tube or the like with means for resiliently restraining the outward expansion thereof.

Another object of the invention is to provide a hydraulic brake expander tube or the like with an annular spring molded to the periphery thereof for resiliently restraining outward expansion thereof.

Still another object of the invention is to provide a hydraulic brake expander tube or the like with a corrugated, spring steel, flat band about the periphery thereof and to which the expander tube is molded.

These and other objects residing in the arrangement, combination and construction of the parts will be apparent from the following specification when taken with the accompanying drawing, in which Fig. 1 is a side elevation partly broken away to show a section of an expander tube for hydraulic brakes, and Fig. 2 is a vertical section through the expander tube disclosed in Fig. 1 disclosing an internal elevation of the tube, a section through the tube and the reinforcing spring band about the periphery thereof.

Referring particularly to the drawing, the reference character 1 indicates a hydraulic brake expander tube preferably of rubber or some equivalent composition reinforced with fabric. The tube 1 may be of any conventional structure except for the application thereto of the reinforcing flat corrugated spring steel endless band 2 disposed about the periphery thereof. The spring steel band 2 and the tube 1 are molded together employing preferably a conventional method of molding or "welding" rubber to metal. While it is not essential to the broad purposes of the present invention that the spring steel band 2 and the tube 1 be molded together, it is preferable in order to avoid wear on the tube 1 during use.

The tube 1 has a hollow interior 3 shown particularly in Fig. 2. The interior 3 is connected to a suitable source of hydraulic fluid by a suitable stem 4. It will be understood that the source of hydraulic fluid, not shown, consists of a suitable hydraulic braking system by means of which hydraulic fluid from a suitable pressure source is valved to the tube 1 or is developed and forced into the tube 1. However, it will be apparent that any such system or arrangement is not a part of the present invention.

The operation of the structure according to the present invention is as follows:

When a light pressure is applied to the brake pedal which operates the brake system to direct hydraulic brake fluids to the tube 1, the tendency of the tube 1 to expand outwardly is resiliently resisted by the spring band 2. However, upon increasing of the pressure admitted to the tube 1 beyond a predetermined point, the spring band 2 expands permitting the outward expansion of the tube 1 to cause an application of the brakes, also not shown. Conversely upon a reduction in hydraulic fluid pressure within the tube 1, the spring band 2 causes the expander tube 1 to contract to its initial position upon release of brake pressure fluid, reducing drag. It will be understood that by constructing the spring band 2 of corrugated spring steel and having the tube 1 molded thereto, there is provided an integral expander tube and spring assembly which is not only effective to provide the desired results, but also an assembly which is not subject to wear due to any rubbing action between the spring band 2 and the tube 1. While the invention has been described particularly as relating to a hydraulic brake expander tube, it will be understood that the invention has other applications. It is, therefore, contemplated that the invention apply to expandable annular tubes even though they may not be used for hydraulic brakes.

It will also be apparent that the spring band 2 protects the tube against chipping action against the brake band and avoids, if desired, the use of shim or shield between the ends of adjacent brake blocks to protect the tube.

Having thus described my invention, what I desire to secure by Letters Patent and claim is:

1. In combination with an expander tube of generally cylindrical form for a hydraulic brake or the like, a generally cylindrical, transversely corrugated, peripheral, spring metal, endless band about the outer periphery only of the tube and in contact therewith.

2. In combination with an expander tube of generally cylindrical form for a hydraulic brake or the like, a generally cylindrical, transversely corrugated, peripheral, spring metal, endless band about the outer periphery only of the tube and molded thereto.

3. In combination with an expander tube of generally cylindrical form for a hydraulic brake or the like, a generally cylindrical, transversely corrugated, spring steel, endless band about the outer periphery only of the tube and molded thereto.

4. In combination with an endless tube of generally cylindrical form of rubber or the like, a generally cylindrical, transversely corrugated, endless, yieldable metallic band about the outer periphery only of the tube and molded thereto.

5. In combination with an expander tube of generally cylindrical form for a hydraulic brake or the like, an endless tension spring about the outer periphery only of the tube and in contact therewith for restricting outward expansion thereof.

6. An expander tube for hydraulic brakes having a generally cylindrical tubular portion and a generally cylindrical superimposed spring metal portion extending completely around the tube and in contact with the outer cylindrical portion thereof.

CHARLES HOLLERITH.